United States Patent
Hong et al.

(10) Patent No.: US 10,756,533 B2
(45) Date of Patent: Aug. 25, 2020

(54) BATTERY PACK CHARGE CONTROL DEVICE AND METHOD

(71) Applicant: LG CHEM, LTD., Seoul (KR)

(72) Inventors: Sung Ju Hong, Cheongju-Si (KR); Ho Chol Nam, Cheongju-Si (KR); Dong Hyun Kim, Sejong (KR); Hak In Kim, Cheongju-Si (KR)

(73) Assignee: LG CHEM, LTD., Seoul (KR)

( * ) Notice: Subject to any disclaimer, the term of this patent is extended or adjusted under 35 U.S.C. 154(b) by 366 days.

(21) Appl. No.: 15/578,000

(22) PCT Filed: Aug. 4, 2016

(86) PCT No.: PCT/KR2016/008609
§ 371 (c)(1),
(2) Date: Nov. 29, 2017

(87) PCT Pub. No.: WO2017/039165
PCT Pub. Date: Mar. 9, 2017

(65) Prior Publication Data
US 2018/0294664 A1 Oct. 11, 2018

(30) Foreign Application Priority Data
Sep. 2, 2015 (KR) .................. 10-2015-0124244

(51) Int. Cl.
*H02H 7/18* (2006.01)
*H02J 7/00* (2006.01)

(52) U.S. Cl.
CPC .............. *H02H 7/18* (2013.01); *H02J 7/00* (2013.01); *H02J 7/0029* (2013.01); *H02J 7/00302* (2020.01)

(58) Field of Classification Search
CPC .. H02H 7/18; H02J 7/00; H02J 7/0029; H02J 7/00302
(Continued)

(56) References Cited

U.S. PATENT DOCUMENTS 6,208,117 B1   3/2001 Hibi
6,487,670 B1 * 11/2002 Racino ............. G01R 19/16542
                                                        320/132
(Continued)

FOREIGN PATENT DOCUMENTS

CN    102110997 A    6/2011
CN    103887570 A    6/2014
(Continued)

OTHER PUBLICATIONS

European Search Report for Appl. No. 16842131.1 dated Sep. 4, 2018.
(Continued)

*Primary Examiner* — M Baye Diao
(74) *Attorney, Agent, or Firm* — Birch, Stewart, Kolasch & Birch, LLP

(57) ABSTRACT

The present invention relates to a battery pack charging control device that wakes up a micro control unit (MCU) in operation in a sleep mode, while a battery pack is in a constant voltage charged state, the battery pack charging control device including an analog front end (AFE) for changing before the MCU operates in the sleep mode, an over-voltage protection level value to a higher value than a current value, generating an over-voltage trip signal and delivering the over-voltage trip signal to the MCU in operation in the sleep mode to control to wake up the MCU in operation in the sleep mode, when an increased voltage value of the battery pack due to connection of an external charger is equal to or greater than the changed over-voltage protection level value.

8 Claims, 3 Drawing Sheets

(58) Field of Classification Search
USPC .......................................................... 320/162
See application file for complete search history.

(56) References Cited

U.S. PATENT DOCUMENTS

| | | | |
|---|---|---|---|
| 8,742,962 B2* | 6/2014 | Murakami | G01D 5/00 |
| | | | 341/139 |
| 9,470,725 B2* | 10/2016 | Hanssen | G01R 21/006 |
| 9,509,162 B2* | 11/2016 | Carpenter, Jr. | H02J 7/0072 |
| 2011/0074334 A1 | 3/2011 | Wang et al. | |
| 2011/0296218 A1 | 12/2011 | Kim et al. | |
| 2012/0032643 A1 | 2/2012 | Yun et al. | |
| 2012/0162828 A1 | 6/2012 | Holsen et al. | |

FOREIGN PATENT DOCUMENTS

| | | | |
|---|---|---|---|
| CN | 104396115 A | 3/2015 | |
| DE | 10 2009 017 089 A1 | 10/2010 | |
| JP | 6-105458 A | 4/1994 | |
| JP | 8-339819 A | 12/1996 | |
| JP | 2004-194428 A | 7/2004 | |
| JP | 2008-125268 A | 5/2008 | |
| JP | 2008-148369 A | 6/2008 | |
| JP | 2012-125045 A | 6/2012 | |
| JP | 2014-52296 A | 3/2014 | |
| KR | 10-2004-0045408 A | 6/2004 | |
| KR | 10-2005-0120161 A | 12/2005 | |
| KR | 10-0677121 B1 | 2/2007 | |
| KR | 10-2007-0105220 A | 10/2007 | |
| KR | 10-2010-0054487 A | 5/2010 | |
| KR | 10-2011-0004441 A | 1/2011 | |
| KR | 10-1074785 B1 | 10/2011 | |
| KR | 10-1213479 B1 | 12/2012 | |
| KR | 10-2015-0054532 A | 5/2015 | |
| WO | WO 2008/109691 A2 | 9/2008 | |
| WO | WO 2013/031320 A1 | 3/2013 | |

OTHER PUBLICATIONS

International Search Report (PCT/ISA/210) issued in PCT/KR2016/008609, dated Nov. 28, 2016.

* cited by examiner

BATTERY PACK CHARGE CONTROL DEVICE AND METHOD

TECHNICAL FIELD

The present invention relates to a battery pack charging control device and method, and more particularly, to a battery pack charging control device and method capable of solving a limitation that a charging current is not recognized when a battery pack in operation in a sleep mode is supplied with a small amount of the charging current.

BACKGROUND ART

A micro control unit (MCU) of a prior battery management system (BMS) does not recognize a small amount of a charging current supplied during operation in a sleep mode. In detail, after a battery pack reaches a constant voltage (CV) charging period, when a charger is connected thereto and a charging current is provided in a state where the MCU operates in a sleep mode, a small amount of the charging current is supplied, since the battery pack is in a full charged state. At this point, a limitation frequently occurs that the MCU of the BMS does not wake from the sleep mode, even if the charger is connected.

On the other hand, as a method for addressing the limitation that the MAC of the BMS does not wake up from the sleep mode, a method for configuring a separate circuit capable of recognizing whether a charger is connected, a method for modifying a circuit of a charger in order to generate and deliver a wake up signal for forcibly waking up the MCU of the BMS, and a method for making shorter a wake up period of a real time clock of the MCU of the BMS, etc., have been used. However, the method for configuring a separate circuit or the method for modifying the circuit of the charger becomes a reason for increasing a product manufacturing cost, and the method for making shorter the wake up period of the real time clock becomes a reason for increasing a consumption current of the battery pack and shortens the life of the product.

Accordingly, it is required to develop a technique capable of recognizing a connection of a charger and waking up an MCU without a circuit modification, when the charger is connected to a battery pack in a state where the battery pack of a BMS is fully charged and the MCU operates in a sleep mode.

DISCLOSURE OF THE INVENTION

Technical Problem

The present invention provides a battery pack charging control device and method capable of addressing a limitation that an MCU in operation in a sleep mode does not detect a connection of a charger and does not wake up, when the charger is connected to the MCU of a BMS, which is operating in the sleep mode.

The present invention also provides a battery pack charging control device and method capable of recognizing a connection of a charger and waking up an MCU without modifying a circuit of a BMS, when the MCU of the BMS, of which battery pack is fully charged, is in operation in a sleep mode, and a charger is connected thereto.

Technical Solution

A battery pack charging control device according to an embodiment of the present invention wakes up a micro control unit (MCU) in operation in a sleep mode, while a battery pack is in a constant voltage charged state. The battery pack charging control device includes: an analog front end (AFE) for changing before the MCU operates in the sleep mode, an over-voltage protection level value to a higher value than a current value, generating an over-voltage trip signal and delivering the over-voltage trip signal to the MCU in operation in the sleep mode to control to wake up the MCU in operation in the sleep mode, when an increased voltage value of the battery pack due to connection of an external charger is equal to or greater than the changed over-voltage protection level value.

The AFE may include: a battery pack voltage monitoring unit for acquiring, in real time, the voltage of the battery pack; an MCU sleep mode operation condition satisfaction determining unit for determining that a sleep mode operation condition is satisfied, when a charging/discharging current does not exist on a circuit before the MCU operates in the sleep mode, and a communication connection between the MCU before operating in the sleep mode and an external system is tripped out; a battery pack constant voltage charged state determining unit for determining the battery pack to be in the constant voltage charged state, when a voltage value acquired by the battery pack voltage monitoring unit is equal to or greater than a preset voltage value of the constant voltage charged state in a provided storage device; an over-voltage protection level value automatic setting unit for changing the over-voltage protection level value before operating in the sleep mode to a higher value than an existing value; an MCU sleep mode allowing signal generating unit for generating an MCU sleep mode allowing signal that is a signal for allowing a current operation mode of the MCU before operating in the sleep mode to be switched to the sleep mode, and deliver the MCU sleep mode allowing signal to the MCU before operating in the sleep mode; a charger connection recognizing unit for recognizing a connection of the external charger by recognizing the voltage value of the battery pack, which is increased due to the connection of the external charger; an over-voltage protection trip signal generation necessity determining unit for determining that the over-voltage protection trip signal needs to be generated, when the increased voltage value of the battery pack is equal to or greater than the over-voltage protection level value; and an over-voltage protection trip signal generating unit for generating the over-voltage protection trip signal and delivering the over-voltage protection trip signal to the MCU in operation in the sleep mode.

The over-voltage protection level value automatic setting unit may re-change the changed over-voltage protection level value to the over-voltage protection level value before operating in the sleep mode, when the MCU in operation in the sleep mode is woken up by the over-voltage protection trip signal.

On the other hand, a battery pack charging control method include: a battery pack voltage acquiring step for acquiring a battery pack voltage in real time; a MCU sleep mode operation condition satisfaction determining step for determining whether an MCU sleep mode operation condition is satisfied; a constant voltage charging state determining step for determining whether the battery pack is in a constant voltage charged state, when the MCU sleep mode operation condition is satisfied as a determination result; an over-voltage protection level value changing step for changing an over-voltage protection level value to a higher value than a current value, when the battery pack is in the constant value charged state as the determination result; an MCU sleep mode allowing step for generating an MCU sleep mode allowing signal that is a signal for allowing a current operation mode of the MCU to be switched to the sleep mode, and delivering the MCU sleep mode allowing signal to the MCU; a charger connection recognizing step for recognizing whether an external charger is connected by recognizing a voltage value of the battery pack, which is increased due to the connection of the external charger; a trip signal necessity determining step for determining whether an over-voltage protection trip signal needs to be generated, which is a signal for waking up the MCU in operation in the sleep mode; and an over-voltage protection trip signal generating and delivering step for generating the over-voltage protection trip signal and deliver the over-voltage protection trip signal to the MCU in operation in the sleep mode to wake up the MCU, when it is determined that the over-voltage protection trip signal needs to be generated as the determination result.

The MCU sleep mode operation condition satisfaction determining step may further include: a charging/discharging current existence determining step for determining whether a charging/discharging current exists on a circuit; and a communication connection determining step for determining that the MCU sleep mode operation condition is satisfied, when the charging/discharging current does not exist and communication with an external system fails as a determination result.

The communication connection determining step may further include: a communication check signal generating and delivering step for generating a communication check signal for requesting a check whether to be in a communication state with the external system, and delivering the communication check signal to the MCU; a response signal receiving step for receiving, from the MCU, a communication connection signal or a communication failure signal as a response signal to the communication check signal; and a final MCU sleep mode operation condition determining step for finally determining that the MCU sleep mode operation conditions are all satisfied, when the communication failure signal is received.

In the trip signal necessity determining step, it may be determined that the over-voltage protection trip signal needs to be generated, when a current voltage value of the battery pack has a value equal to or greater than the changed over-voltage protection level value.

The battery pack charging control method may further include a step for resetting the changed over-voltage protection level value to the value before the changing, when the MCU in operation in the sleep mode is woken up by the over-voltage protection trip signal.

Advantageous Effects

A battery pack charging control device and method according to embodiments of the present invention may allow an analog front end (AFE) of a battery managing system to recognize a connection of a charger and wake up an MCU in operation in a sleep mode.

In addition, the battery pack charging control device and method according to embodiments of the present invention may generate an over-voltage protection trip signal and wake up the MCU in operation in the sleep mode, when the charger is connected after an over-voltage protection level value of the battery managing system is reset.

MODE FOR CARRYING OUT THE INVENTION

Figure 1:
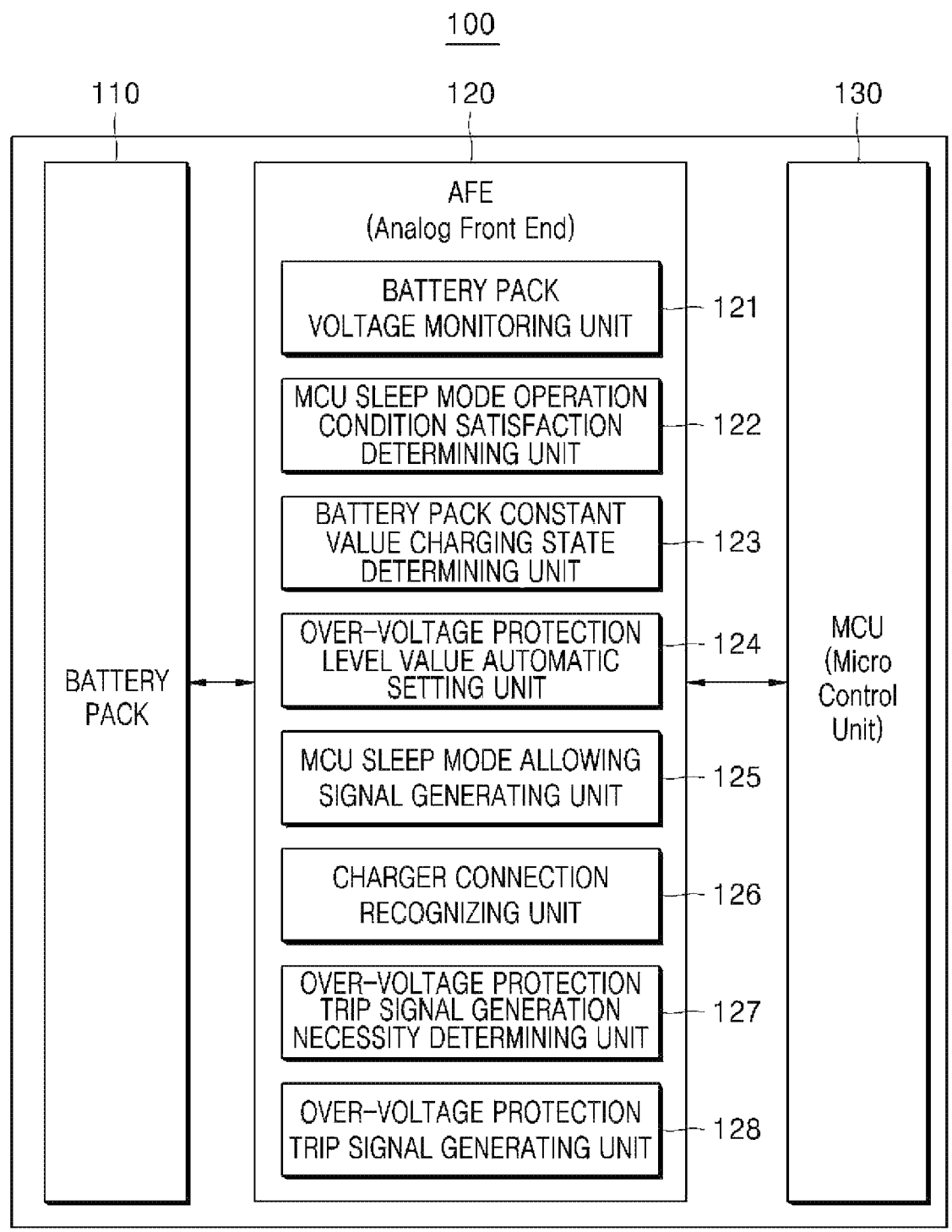
FIG. 1 illustrates a configuration diagram of a battery pack charging control device according to an embodiment of the present invention.

Hereinafter, exemplary embodiments according to the present invention will be described in detail with reference to contents illustrated in the accompanying drawings. However, the present invention is not limited or restricted to the exemplary embodiments. Like reference numerals presented in each drawing represent members substantially performing like functions.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. Terms used herein are provided for merely explaining specific embodiments of the present disclosure, not limiting the disclosure. As used herein, the singular forms "a," "an" and "the" are intended to include the plural forms as well, unless the context clearly indicates otherwise.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant. In this case, the meanings of the arbitrarily selected terminologies shall be defined in the relevant part of the detailed description. Accordingly, the specific terminologies used herein should be understood based on the unique meanings thereof and the whole context of the present invention.

In addition, when an element is referred to as "comprising" or "including" a component, it does not preclude another component but may further include the other component unless the context clearly indicates otherwise.

A battery pack according to an embodiment of the present invention stores and provides electric energy. Such a battery pack may include a plurality of chargeable/dischargeable battery cells. In addition, the battery pack may include a plurality of battery modules. The battery module may be configured of a plurality of battery cells. In other words, the battery pack may be configured of at least a plurality of battery modules configured of the prescribed number of battery cells. Each battery module configuring the plurality of battery modules may be electrically connected in series with and/or in parallel to each other in various ways in order to be suitable for the specification of a battery pack or a load, etc. In addition, each battery cell configuring the plurality of battery cells configuring the battery module may be electrically connected in series with and/or in parallel to each other. Here, a type of the battery cell is not particularly restricted, and the battery cell may be configured of, for example, a lithium ion cell, lithium polymer cell, nickel-cadmium battery, nickel hydrogen cell, or nickel-zinc cell, etc.

1. An example of a battery pack charging control device according to an embodiment of the present invention FIG. 1 illustrates a configuration diagram of a battery pack charging control device according to an embodiment of the present invention.

Referring to FIG. 1, the battery pack charging control device 100 according to an embodiment of the present invention may include a battery pack 100, an analog front end (AFE) 120, and a micro control unit (MCU) 130.

The battery pack 110 may reach a constant voltage (CV) period, when being charged with a charging power supply voltage provided from an external charger (not shown) that is electrically connected to the battery pack charging control device 100, and approaching a full charged state.

The AFE 120 may include a battery pack voltage monitoring unit 121, an MCU sleep mode operation condition satisfaction determining unit 122, a battery pack constant voltage charged state determining unit 123, an over-voltage protection level value automatic setting unit 124, an MCU sleep mode allowing signal generating unit 125, a charger connection recognizing unit 126, an over-voltage protection trip signal generation necessity determining unit 127, and an over-voltage protection trip signal generating unit 128.

The battery pack voltage monitoring unit 121 may monitor a voltage value of the battery pack. For example, the battery pack voltage monitoring unit 121 may measure a voltage of the battery pack 110 and monitor a change in voltage under a control of the MCU 130. In addition, the battery pack voltage monitoring unit 121 may measure a voltage of the battery pack 110 according to a prescribed period preset in a storage device (not shown) such as a ROM or RAM provided in the AFE 120, monitor the change in the voltage, and store the monitored voltage value in the storage device.

The MCU sleep mode operation condition satisfaction determining unit 122 may determine whether an environment of each component unit of the battery pack charging control device 100 satisfies a condition that the MCU 130 may operate in a sleep mode.

In detail, the MCU sleep mode operation condition satisfaction determining unit 122 may include a charging/discharging current existence determining unit (not shown) and a communication connection determining unit (not shown).

The charging/discharging current existence determining unit may determine whether there is a charging/discharging current on a circuit of the battery pack charging control device 100. As a determination result, when there is not a charging/discharging current on the circuit, it may be determined that a first condition among MCU sleep mode operation conditions, namely, a condition that there is not a charging/discharging current on the circuit is satisfied. Then, the charging/discharging current existence determining unit may command to start an operation of the communication connection determining unit.

The communication connection determining unit may generate a communication check signal for checking whether the MCU 130 and an external system (not shown) are in a communication connection state, and deliver the communication check signal to the MCU 130. Then, the communication connection determining unit may receive a communication connection signal or a communication failure signal as a response signal to the communication check signal. When the communication failure signal is received, the communication connection determining unit may finally determine that a second condition among the MCU sleep mode operation conditions, namely, a condition that communication between the MCU 130 and the external system fails is satisfied, and the MCU sleep mode operation conditions are all satisfied. Then, the communication connection determining unit may command to start an operation of the battery pack constant voltage charged state determining unit 123.

On the other hand, the communication connection signal is a signal indicating a state where the battery pack charging control device 100 is electrically connected to an external system and the communication connection is maintained. The communication failure signal is a signal indicating a state where the battery pack charging control device 100 is not electrically connected to the external system and the communication connection is tripped out. When receiving the communication check signal from the communication connection determining unit, the MCU 130 may generate, as a response signal thereto, the communication connection signal or communication failure signal and deliver the generated communication connection signal or communication failure signal to the AFE 120. In other words, the MCU 130 may generate the communication connection signal or communication failure signal to deliver the same to the MCU sleep mode operation condition satisfaction determining unit 122 of the AFE 120.

The battery pack constant voltage charged state determining unit 123 may determine whether the battery pack 110 is in a constant voltage charged state, namely, a full charged state. As a determination result, when the battery pack 110 is in the constant voltage charged state, the battery pack constant voltage charged state determining unit 123 may determine the battery pack to be in the full charged state and command to start an operation of the over-voltage protection level value automatic setting unit 124.

In detail, the battery pack constant voltage charged state determining unit 123 may determine that the battery pack 110 is in the full charged state, when a voltage value of the battery pack 110, which is obtained by the battery pack voltage monitoring unit 121, is equal to or greater than a preset voltage value of the constant voltage charged state. Here, the voltage value of the constant voltage charged state may be set to the prescribed voltage value according to a specification and state of the battery pack 110.

The over-voltage protection level value automatic setting unit 124 may change to reset a current over-voltage protection level value to a higher value. In detail, the over-voltage protection level value automatic setting unit 124 may change to rest the current over-voltage protection level value to a value higher by 3 to 5 mV than the current value before the MCU 120 operates in the sleep mode, when the battery pack 110 is in the full charged state and conditions for the MCU 130 to operate in the sleep mode are all satisfied. Then, the over-voltage protection level value automatic setting unit 124 may command to start an operation of the MCU sleep mode allowing signal generating unit 125.

Furthermore, the over-voltage protection level value automatic setting unit 124 may reset again the current over-voltage protection level value to a value before the change, when the MCU 130 in operation is woken up.

The MCU sleep mode allowing signal generating unit 125 may generate an MCU sleep mode allowing signal and deliver the MCU sleep mode allowing signal to the MCU 130. Here, the MCU sleep mode allowing signal is a signal for allowing a current operation mode of the MCU 130 to be switched to the sleep mode. Then, the MCU sleep mode allowing signal generating unit 125 may command to start an operation of the charger connection recognizing unit 126.

In detail, an MCU of an existing battery pack charging control device switches a current operation mode to a sleep mode for itself, when a sleep mode operation condition is satisfied. On the other hand, the MCU 130 of the battery pack charging control device 100 according to an embodiment of the present invention may operate in the sleep mode only when the MCU sleep mode allowing signal is received from the AFE 120.

The charger connection recognizing unit 126 may recognize a connection of the charger by recognizing that a voltage of the battery pack 110 is increased due to the connection of the charger to the battery pack charging control device 100. Then, the charger connection recognizing unit 126 may command to start an operation of the over-voltage protection trip signal generation necessity determining unit 127. In detail, when the voltage value of the battery pack 110 acquired by the battery pack voltage monitoring unit 121 is increased to or over a prescribed voltage value for determining whether the charger is connected, the prescribed voltage value being pre-stored in a provided storage device, the charger connection recognizing unit 126 may recognize the increase of the voltage value to recognize that the charger is connected to the battery pack charging control device 100.

When a current voltage value of the battery pack 110 acquired by the battery pack voltage monitoring unit 121 is equal to or greater than an over-voltage protection level value, the over-voltage protection trip signal generation necessity determining unit 127 may determine that an over-voltage protection trip signal needs to be generated. Then, the over-voltage protection trip signal generation necessity determining unit 127 may command to start an operation of the over-voltage protection trip signal generating unit 128. Here, the over-voltage level value is a value set by the over-voltage protection level value automatic setting unit 124.

The over-voltage protection trip signal generating unit 128 may generate the over-voltage protection trip signal and deliver the over-voltage protection trip signal to the MCU 130. In detail, the over-voltage protection trip signal is a signal capable of waking up the MCU 130 in operation in a sleep mode.

The MCU 130 may not operate in the sleep mode until the MCU sleep mode allowing signal is delivered from the AFE 120.

Then, when the over-voltage protection trip signal is received from the AFE 120, the MCU 130 in operation in the sleep mode may be woken up.

2. An example of a battery pack charging control method according to an embodiment of the present invention FIG. 2 illustrates a flow chart of the battery pack charging control method according to the embodiment of the present invention.

Figure 2:
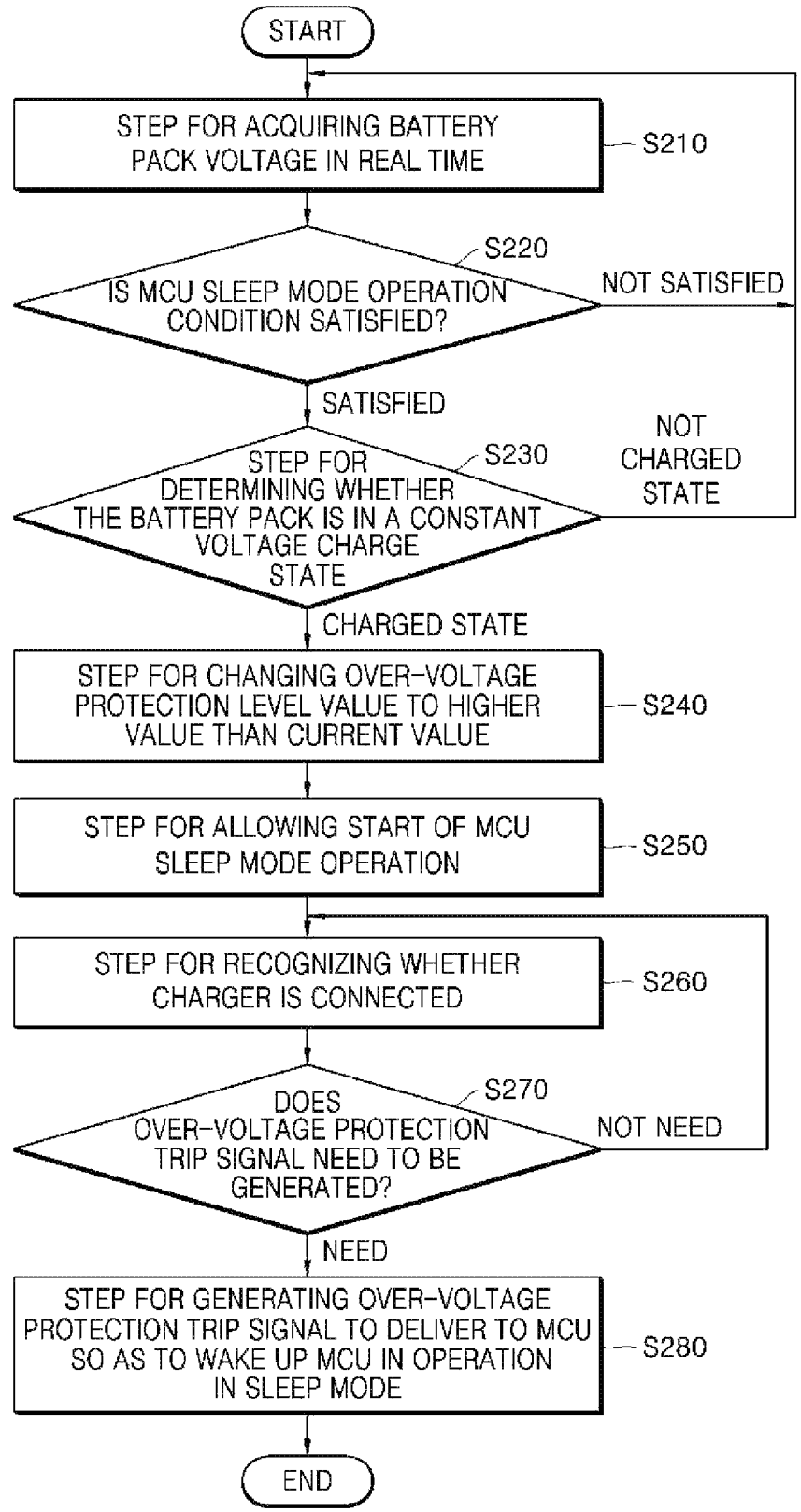
FIG. 2 illustrates a flow chart of a battery pack charging control method according to an embodiment of the present invention.

Referring to FIG. 2, the AFE 120 of the battery pack charging control device 100 according to the embodiment of the present invention may perform a battery pack voltage acquiring step 210 for acquiring the voltage of the battery pack 110 in real time.

Then, the AFE 120 may perform a MCU sleep mode operation condition satisfaction determining step S220 for determining whether the MCU satisfies the sleep mode operation conditions.

Figure 3:
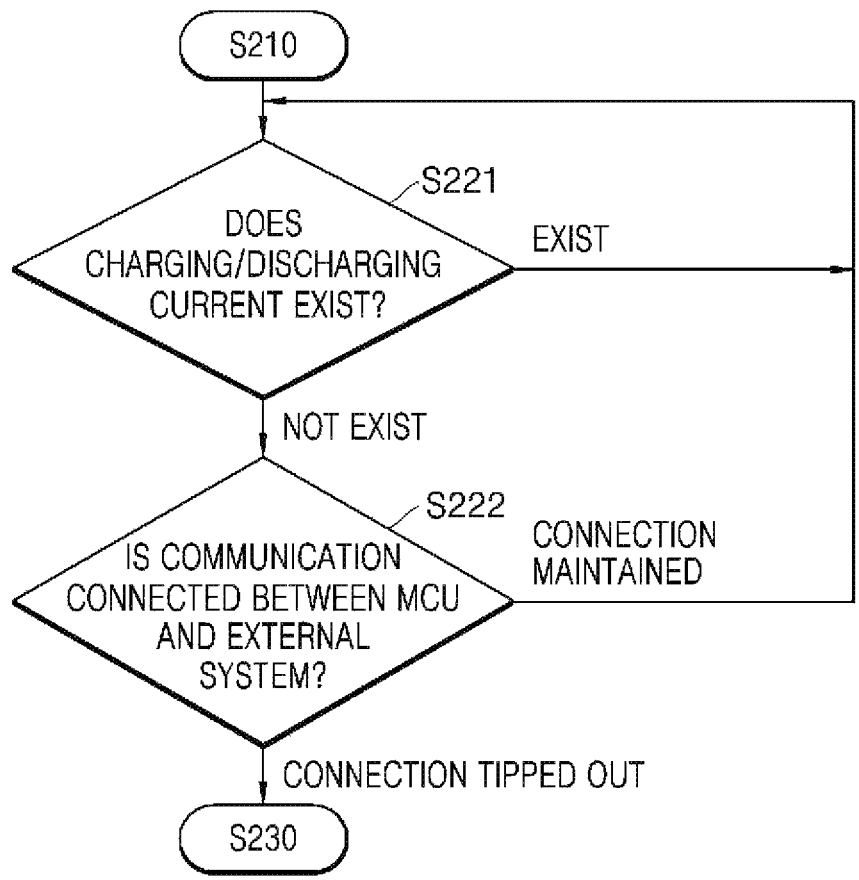
FIG. 3 is a flow chart of an MCU sleep mode operation condition satisfaction determining step in the battery pack charging control method according to an embodiment of the present invention.

In detail, the MCU sleep mode operation condition satisfaction determining step S220 may further perform steps illustrated in FIG. 3.

FIG. 3 is a flow chart of a step for determining whether the sleep mode operation conditions of the MCU are satisfied in the battery pack charging control method according to the embodiment of the present invention.

Referring to FIG. 3, the AFE 120 may perform a charging/discharging current existence determining step S221 for determining whether the charging/discharging current exists on the circuit of the battery pack charging control device 100. As a determination result, when the charging/discharging current exists on the circuit, the AFE 120 may move to the battery pack voltage acquiring step 210 and perform the corresponding step.

When the charging/discharging current does not exist on the circuit, the AFE 120 may perform a communication connection determining step S222 for determining whether communication between the MCU 120 and an external system (not shown) is connected. As a determination result, when the communication connection is maintained, the AFE 120 may move to the battery pack voltage acquiring step 210 and perform the corresponding step. In detail, the communication connection determining step S222 performed by the AFE 120 may further perform the following steps. The AFE 120 may perform a communication check signal generating and delivering step for generating a communication check signal and delivering the communication check signal to the MCU 130. Then, as a response signal to the communication check signal, the AFE 120 may perform a response signal receiving step for receiving a communication connection signal or a communication failure signal from the MCU 130. When the communication failure signal is received, the AFE 120 may perform a final MCU sleep mode operation condition determining step for finally determining that the MCU sleep mode operation conditions are all satisfied.

Then, the AFE 120 may perform a constant voltage charged state determining step S230 for determining whether the battery pack is in a constant voltage charged state. As a determination result, when the battery pack is not in the constant voltage charged state, the AFE 120 may move to the battery pack voltage acquiring step S210 and perform the corresponding step.

When the battery pack is in the constant voltage charging state, the AFE 120 may perform an over-voltage protection level value changing step S240 for changing the over-voltage protection level value to a higher value than a current value.

Then, the AFE 120 may perform an MCU sleep mode allowing step S250 for allowing a start of an MCU sleep mode operation. For example, the AFE 120 may perform the MCU sleep mode allowing step S250 for generating an MCU sleep mode allowing signal, which is a signal for allowing a current operation mode of the MCU 130 to be switched to the sleep mode, and deliver the MCU sleep mode allowing signal to the MCU 130.

Then, the AFE 120 may perform a charger connection recognizing step S260 for recognizing whether the charger is connected. For example, the AFE 120 may perform the charger connection recognizing step S260 for recognizing connection of the charger by recognizing that a voltage of the battery pack 110 is increased due to connection of the charger to the battery pack charging control device 100.

Then, the AFE 120 may perform a trip signal necessity determining step S270 for determining whether an over-voltage protection trip signal needs to be generated. For example, the AFE 120 may determine whether the over-voltage protection trip signal needs to be generated by determining whether a current voltage value of the battery pack 110, which is acquired in real time, is equal to or greater than an over-voltage protection level value. When the current voltage value of the battery pack 110 is equal to or greater than the over-voltage protection level value, it may be determined that the over-voltage protection trip signal needs to be generated.

As a determination result, when it is not determined that the over-voltage protection trip signal needs to be generated, the AFE 120 may move to the charger connection recognizing step S260 and perform the corresponding step.

When it is determined that the over-voltage protection trip signal needs to be generated, the AFE 120 may perform the over-voltage protection trip signal generating and delivering step S280 for generating the over-voltage protection trip signal and delivering the over-voltage protection trip signal to the MCU 130 to wake up the MCU 130 in operation in the sleep mode.

Typically, terms used herein, in particular, in the claims (e.g., in the body of the claims), are intended as "open" terms (e.g., "comprise" should be interpreted as "comprise but is not limited to", "have" as "have at least that or more", and "contain" as "contain but is not limited thereto"). If the specific number of claims is intended for description of introduced claims, it is understood that such intention is explicitly described in the claims, and that when such a description does not exist, such intention does not exist.

Only the specific features of the present invention has been illustrated and described herein, and such various modifications and changes may occur with respect to those of ordinary skilled in the art. Therefore, it is understood that the claims are intended to cover the modifications and changes that fall within the spirit of the present invention.

What is claimed is:

1. A battery pack charging control device for waking up a micro control unit (MCU) in operation in a sleep mode, while a battery pack is in a constant voltage charging state, the battery pack charging control device comprising:

an analog front end (AFE) for changing before the MCU operates in the sleep mode, an over-voltage protection level value to a higher value than a current value, generating an over-voltage trip signal and delivering the over-voltage trip signal to the MCU in operation in the sleep mode to control to wake up the MCU in operation in the sleep mode, when an increased voltage value of the battery pack due to connection of an external charger is equal to or greater than the changed cover-voltage protection level value, wherein the AFE comprises an MCU sleep mode operation condition satisfaction determining unit for determining that a sleep mode operation condition is satisfied, the condition consisting of a charging/discharging current being not existing on a circuit before the MCU operates in the sleep mode, and a communication connection between the MCU before operating in the sleep mode and an external system is tripped out.

2. The battery pack charging control device of claim 1, wherein the AFE further comprises:

a battery pack voltage monitoring unit for acquiring, in real time, the voltage of the battery pack;

a battery pack constant voltage charging state determining unit for determining the battery pack to be in the constant voltage charging state, the condition consisting of a voltage value acquired by the battery pack voltage monitoring unit being equal to or greater than a preset voltage value of the constant voltage charging state in a provided storage device;

an over-voltage protection level value automatic setting unit for changing the over-voltage protection level value before operating in the sleep mode to a higher value than an existing value;

an MCU sleep mode allowing signal generating unit for generating an MCU sleep mode allowing signal that is a signal for allowing a current operation mode of the MCU before operating in the sleep mode to be switched to the sleep mode, and deliver the MCU sleep mode allowing signal to the MCU before operating in the sleep mode;

a charger connection recognizing unit for recognizing a connection of the external charger by recognizing the voltage value of the battery pack, which is increased due to the connection of the external charger;

an over-voltage protection trip signal generation necessity determining unit for determining that the over-voltage protection trip signal needs to be generated, the condition consisting of the increased voltage value of the battery pack being equal to or greater than the cover-voltage protection level value; and an over-voltage protection trip signal generating unit for generating the over-voltage protection trip signal and delivering the over-voltage protection trip signal to the MCU in operation in the sleep mode.

3. The battery pack charging control device of claim 2, wherein the over-voltage protection level value automatic setting unit re-changes the changed cover-voltage protection level value to the cover-voltage protection level value before operating in the sleep mode, when the MCU in operation in the sleep mode is woken up by the over-voltage protection trip signal.

4. A battery pack charging control method comprising:

a battery pack voltage acquiring step for acquiring a battery pack voltage in real time;

a MCU sleep mode operation condition satisfaction determining step for determining whether an MCU sleep mode operation condition is satisfied;

a constant voltage charging state determining step for determining whether the battery pack is in a constant voltage charging state, when the MCU sleep mode operation condition is satisfied as a determination result;

an over-voltage protection level value changing step for changing an over-voltage protection level value to a higher value than a current value, when the battery pack is in the constant value charged state as the determination result;

an MCU sleep mode allowing step for generating an MCU sleep mode allowing signal that is a signal for allowing a current operation mode of the MCU to be switched to the sleep mode, and delivering the MCU sleep mode allowing signal to the MCU;

a charger connection recognizing step for recognizing whether an external charger is connected by recognizing a voltage value of the battery pack, which is increased due to the connection of the external charger;

a trip signal necessity determining step for determining whether an over-voltage protection trip signal needs to be generated, which is a signal for waking up the MCU in operation in the sleep mode; and an over-voltage protection trip signal generating and delivering step for generating the over-voltage protection trip signal and deliver the over-voltage protection trip signal to the MCU in operation in the sleep mode to wake up the MCU, when it is determined that the over-voltage protection trip signal needs to be generated as the determination result.

5. The battery pack charging control method of claim 4, wherein the MCU sleep mode operation condition satisfaction determining step further comprises:

a charging/discharging current existence determining step for determining whether a charging/discharging current exists on a circuit; and a communication connection determining step for determining that the MCU sleep mode operation condition is satisfied, when the charging/discharging current does not exist and communication with an external system fails as a determination result.

6. The battery pack charging control method of claim 4, wherein the communication connection determining step further comprises:

a communication check signal generating and delivering step for generating a communication check signal for requesting a check whether to be in a communication state with the external system, and delivering the communication check signal to the MCU;

a response signal receiving step for receiving, from the MCU, a communication connection signal or a communication failure signal as a response signal to the communication check signal; and a final MCU sleep mode operation condition determining step for finally determining that the MCU sleep mode operation conditions are all satisfied, when the communication failure signal is received.

7. The battery pack charging control method of claim 4, wherein, in the trip signal necessity determining step, it is determined that the over-voltage protection trip signal needs to be generated, when a current voltage value of the battery pack has a value equal to or greater than the changed cover-voltage protection level value.

8. The battery pack charging control method of claim 7, further comprising:

a step for resetting the changed cover-voltage protection level value to the value before the changing, when the MCU in operation in the sleep mode is woken up by the over-voltage protection trip signal.

\* \* \* \* \*